(12) United States Patent
Kim (10) Patent No.: US 11,030,172 B2
(45) Date of Patent: Jun. 8, 2021

(54) DATABASE ARCHIVING METHOD AND DEVICE FOR CREATING INDEX INFORMATION AND METHOD AND DEVICE OF RETRIEVING ARCHIVED DATABASE INCLUDING INDEX INFORMATION

(71) Applicant: ARMIQ Co., Ltd., Seoul (KR)

(72) Inventor: Oxoo Kim, Seoul (KR)

(73) Assignee: ARMIQ Co., Ltd., Seoul (KR)

( * ) Notice: Subject to any disclaimer, the term of this patent is extended or adjusted under 35 U.S.C. 154(b) by 173 days.

(21) Appl. No.: 16/077,236

(22) PCT Filed: Oct. 13, 2016

(86) PCT No.: PCT/KR2016/011465
§ 371 (c)(1),
(2) Date: Aug. 10, 2018

(87) PCT Pub. No.: WO2017/146338
PCT Pub. Date: Aug. 31, 2017

(65) Prior Publication Data
US 2019/0034466 A1 Jan. 31, 2019

(30) Foreign Application Priority Data
Feb. 26, 2016 (KR) .................. 10-2016-0023403

(51) Int. Cl.
*G06F 16/22* (2019.01)
*G06F 16/21* (2019.01)
*G06F 16/11* (2019.01)

(52) U.S. Cl.
CPC ........ *G06F 16/2228* (2019.01); *G06F 16/113* (2019.01); *G06F 16/21* (2019.01); *G06F 16/2282* (2019.01)

(58) Field of Classification Search
None
See application file for complete search history.

(56) References Cited

U.S. PATENT DOCUMENTS 5,860,136 A * 1/1999 Fenner ................ H03M 7/4006
370/396
9,305,045 B1 * 4/2016 Cohen ................... G06F 16/215
(Continued)

FOREIGN PATENT DOCUMENTS

JP 2007-241377 A 9/2007
JP 2009-533731 A 9/2009
(Continued)

*Primary Examiner* — Tony Mahmoudi
*Assistant Examiner* — Umar Mian
(74) *Attorney, Agent, or Firm* — Novick, Kim & Lee, PLLC; Sang Ho Lee (57) ABSTRACT

Provided is a database archiving method for creating index information. According to the exemplary embodiment of the present invention, a database archiving method for creating index information includes selecting at least one record group including a plurality of records from an original table in which data is archived, based on information on a field value; storing group compression data compressed to be created for every record group and a stored key value uniquely assigned to every group compression data, with respect to each of at least one record group, in a compression table; storing the field value and the stored key value corresponding to each of at least one record group, in a group index table; and deleting a plurality of records included in at least one selected record group from the original table.

4 Claims, 8 Drawing Sheets

(56) References Cited

U.S. PATENT DOCUMENTS

| | | | |
|---|---|---|---|
| 10,263,908 B1* | 4/2019 | Ganjoo | H04L 47/76 |
| 2008/0098045 A1* | 4/2008 | Radhakrishnan | G06F 11/00 |
| 2008/0104149 A1* | 5/2008 | Vishniac | G06F 16/22 |
| 2013/0013606 A1 | 1/2013 | Stanfill | |
| 2015/0212999 A1* | 7/2015 | Alvey | G06F 16/2365 |
| | | | 715/227 |

FOREIGN PATENT DOCUMENTS

| | | |
|---|---|---|
| JP | 2012-256144 A | 12/2012 |
| JP | 2013-519141 A | 5/2013 |
| KR | 10-2012-0140668 A | 12/2012 |

* cited by examiner

| Doc.No | Date | Col1 | Col2 | ... |
|---|---|---|---|---|
| 1 | 2002.01 | 1000 | A | ... |
| 2 | 2002.01 | 2000 | B | ... |
| ... | 2002.01 | 1000 | A | ... |
| 90001 | 2002.02 | 1000 | A | ... |
| ... | 2002.02 | 2000 | B | ... |
| 150001 | 2002.03 | 2000 | A | ... |
| ... | 2002.03 | 1000 | A | ... |

710

| | |
|---|---|
| 150001 | 50,000 Rows |
| 150002 | 40,000 Rows |
| 150003 | 28,000 Rows |
| 150004 | 32,000 Rows |
| 150005 | ... |

| Doc.No | ObjID | Index1 | Index2 | ... |
|---|---|---|---|---|
| 1 | 150001 | 1 | 10 | ... |
| 2 | 150002 | 1 | 20 | ... |
| ... | 150001 | 2 | 15 | ... |
| 90,001 | 150003 | 1 | 90,100 | ... |
| ... | 150004 | 1 | 90,200 | ... |
| 150,001 | 150006 | 1 | 150,110 | ... |
| ... | 150005 | 1 | 150,100 | ... |

DATABASE ARCHIVING METHOD AND DEVICE FOR CREATING INDEX INFORMATION AND METHOD AND DEVICE OF RETRIEVING ARCHIVED DATABASE INCLUDING INDEX INFORMATION

TECHNICAL FIELD

The present invention relates to a database archiving method and device and an archived database retrieving method and device, and more particularly, to a method and device of archiving a database using a data compression technique and an index creating technique and a method and a device of retrieving a compressed and archived database using index information.

BACKGROUND ART

As data producing and consuming means, such as PCs, laptop computers, and smart phones, is widely spreading along with the spread of Internet and development of data communication techniques, an amount of data which is produced and consumed today is exponentially increasing. Methods of managing data using a database to effectively classify and utilize the data are widely used in various companies, organizations, and schools. However, as the amount of data is exponentially increased, a capacity of the database will soon reach its limit and it is a reality that there is a limitation in continuously expanding the capacity of the database in terms of cost and management.

Therefore, there is a growing interest in techniques which efficiently archive the database to save the capacity. Specifically, there is a growing interest in a method and a device of archiving a database using a data compression technique and an index creating technique and a method and a device of retrieving a compressed and archived database using the index information.

DISCLOSURE

Technical Problem

An object of the present invention is to provide a database archiving method and device which classify records of a database based on predetermined criteria and compress and archive the database for every classified record to save a capacity of the database.

Further, an object of the present invention is to provide a database retrieving method and a device thereof which more efficiently retrieve a database using created index information when the index information is further created at the time of data archiving.

Further, another object of the present invention is to provide an efficient database retrieving method and a device thereof which retrieve the database archived by the above-mentioned method, in parallel.

Technical Solution

In order to achieve the above-mentioned object, the present invention provides a database archiving method for creating index information, including: selecting at least one record group including a plurality of records from an original table in which data is archived, based on information on a field value; storing group compression data compressed to be created for every record group and a stored key value uniquely assigned to every group compression data, with respect to each of at least one record group, in a compression table; storing the field value and the stored key value corresponding to each of at least one record group, in a group index table; and deleting a plurality of records included in at least one selected record group from the original table.

Desirably, the database archiving method for creating index information may further include, when during the selecting of at least one record group, the at least one record group is selected further based on information on a time, from the original table, storing the information on a time and the stored key value corresponding to each of the at least one record group, in a period index table.

Desirably, the database archiving method for creating index information may further include: storing a primary key value, key index information which is a position in the group compression data, and information on the stored key value corresponding to the group compression data, with respect to each of records included in the original table, in a key index table.

Desirably, when there is at least one connected table which is connected with the original table by means of the primary key, with respect to second group compression data which is created by compressing a plurality of records in at least one connected table, the database archiving method for creating index information may further include retrieving a record having the same primary key value as a record including in the original table, among a plurality of records included in the second group compression data; and further storing sub index information which is a position in the second group compression data with respect to the retrieved record in a record having the same primary key value on the key index table.

Further, in order to achieve the above-mentioned object, the present invention provides a database archiving device for creating index information including: a data selecting unit which selects at least one record group including a plurality of records from an original table in which data is archived, based on information on a field value; a data compressing unit which compresses and creates group compression data for every record group, with respect to each of at least one selected record group; and a DB management unit which stores the group compression data and a stored key value which is uniquely assigned to every group compression data in a compression table, stores the field value and the stored key value corresponding to each of at least one record group in a group index table, and deletes a plurality of records included in at least one selected record group from the original table.

Desirably, when the data selecting unit selects at least one record group from the original table, further based on information on a time, the DB management unit may further store the information on a time and the stored key value corresponding to each of at least one record group, in a period index table.

Desirably, the DB management unit may store a primary key value, key index information which is a position in the group compression data, and information on the stored key value corresponding to the group compression data, with respect to each of records included in the original table, in a key index table.

Desirably, when there is at least one connected table which is connected with the original table by means of the primary key, with respect to second group compression data which is created by compressing a plurality of records in at least one connected table, the DB management unit may further retrieve a record having the same primary key value as a record including in the original table, among a plurality of records included in the second group compression data; and further store sub index information which is a position in the second group compression data with respect to the retrieved record in a record having the same primary key value on the key index table.

Further, in order to achieve the above-mentioned object, the present invention provides an archived database retrieving method using index information including: receiving a retrieving condition for retrieving a record having a predetermined condition for a field value desired by a user from a compression table including group compression data created by compressing a plurality of records corresponding to information on a field value and a unique stored key value corresponding to the group compression data; retrieving a stored key value satisfying the retrieving condition from a group index table in which information on the field value and the stored key value corresponding to the information on the field value are stored; determining the number of DB retrieving processes for retrieving the records in parallel, based on at least one of a performance of a computer which performs retrieval and the number of group compression data corresponding to the stored key value satisfying the retrieving condition; and retrieving records satisfying the retrieving condition in parallel, based on the determined number of DB retrieving processes.

Desirably, when the group compression data created further based on information on a time is included in the compression table and a predetermined condition for the time is further included in the received retrieving condition, the archived database retrieving method using index information may further include: retrieving a stored key value satisfying the retrieving condition from a period index table in which information on the time and the stored key value corresponding to the information on the time are stored.

Desirably, when a retrieving condition for a primary key value is further included in the retrieving condition, the archived database retrieving method using index information may further include retrieving the stored key value of a record satisfying the retrieving condition and the key index information from the key index table in which the primary key value for every record of an original table which is archived to the compression table, key index information which is a position in the group compression data, and information on the stored key value corresponding to the group compression data are stored and the retrieving of records in parallel may perform the retrieval further based on the stored key value and the key index information.

Desirably, when there is at least one connected table which is connected with the original table by means of the primary key, with respect to second group compression data which is created by compressing a plurality of records in at least one connected table, the retrieving of the stored key value and the key index information may further retrieve the sub index information of a record satisfying the retrieving condition from the key index table including sub index information which is a position in the second group compression data for every record, and the retrieving of records in parallel may perform the retrieval further based on the sub index information and the second group compression data.

Desirably, the determining of the number of DB retrieving processes for performing the retrieval in parallel may include: collecting computer performance information on at least one of the number of CPUs included in the computer, a capacity of a memory, and an input/output speed of a storage device; determining the number of group compression data corresponding to the stored key value satisfying the received retrieving condition among the group compression data stored in the compression table; and determining the number of DB retrieving processes for retrieving the records in parallel, based on at least one of the collected computer performance information and the determined number of group compression data.

Further, in order to achieve the above-mentioned object, the present invention provides archived database retrieving device using index information including: a receiving unit which receives a retrieving condition for retrieving a record having a predetermined condition for a field value desired by a user from a compression table including group compression data created by compressing a plurality of records corresponding to information on a field value and a unique stored key value corresponding to the group compression data; an index retrieving unit which retrieves a stored key value satisfying the retrieving condition from a group index table in which information on the field value and the stored key value corresponding to the information on the field value are stored; a retrieval preparing unit which determines the number of DB retrieving processes for retrieving the records in parallel, based on at least one of a performance of a computer which performs retrieval and the number of group compression data corresponding to the stored key value satisfying the retrieving condition; and a parallel retrieving unit which retrieves records satisfying the retrieving condition in parallel, based on the determined number of DB retrieving processes.

Desirably, when the group compression data created further based on information on a time is included in the compression table and a predetermined condition for the time is further included in the received retrieving condition, the index retrieving unit may further retrieve a stored key value satisfying the retrieving condition from a period index table in which information on the time and the stored key value corresponding to the information on the time are stored.

Desirably, when the retrieving condition includes a retrieving condition for a primary key value, the index retrieving unit may further retrieve the stored key value of a record satisfying the retrieving condition and the key index information from the key index table in which the primary key value for every record of an original table which is archived to the compression table, key index information which is a position in the group compression data, and information on the stored key value corresponding to the group compression data are stored and the parallel retrieving unit may perform retrieval further based on the stored key value and the key index information.

Desirably, when there is at least one connected table which is connected with the original table by means of the primary key, with respect to second group compression data which is created by compressing a plurality of records in at least one connected table, the index retrieving unit may further retrieve the sub index information of a record satisfying the retrieving condition from the key index table including sub index information which is a position in the second group compression data for every record and the parallel retrieving unit may perform retrieval further based on the sub index information and the second group compression data.

Desirably, the retrieval preparing unit may collect computer performance information on at least one of the number of CPUs included in the computer, a capacity of a memory, and an input/output speed of a storage device; determine the number of group compression data corresponding to the stored key value satisfying the received retrieving condition among the group compression data stored in the compression table; and determine the number of DB retrieving processes for retrieving the records in parallel, based on at least one of the collected computer performance information and the determined number of group compression data.

Advantageous Effects

According to the present invention, data stored in a database is classified according to a retrieving frequency and an importance and compressed for every classification result to be archived so that a usage capacity of the database is dramatically reduced.

Further, according to the present invention, the index information is created during an archiving process so that an efficiency of retrieving an archived database may be maximized.

BEST MODE

Those skilled in the art may make various modifications to the present invention and the present invention may have various exemplary embodiments, and thus specific embodiments will be illustrated in the drawings and described in detail in the detailed description. However, it should be understood that the invention is not limited to the specific embodiments, but includes all changes, equivalents, or alternatives which are included in the spirit and technical scope of the present invention. In the description of respective drawings, similar reference numerals designate similar elements.

Terms such as first, second, A, or B may be used to describe various components but the components are not limited by the above terms. The above terms are used only to discriminate one component from another component. For example, without departing from the scope of the present invention, a first component may be referred to as a second component, and similarly, a second component may be referred to as a first component. A term of and/or includes a combination of a plurality of related elements or any one of the plurality of related elements.

It should be understood that, when it is described that an element is "coupled" or "connected" to another element, the element may be "directly coupled" or "directly connected" to another element or "coupled" or "connected" to another element through a third element. In contrast, when it is described that an element is "directly coupled" or "directly connected" to another element, it should be understood that no element is not present therebetween.

Terms used in the present application are used only to describe a specific exemplary embodiment but are not intended to limit the present invention. A singular form may include a plural form if there is no clearly opposite meaning in the context. In the present application, it should be understood that term "include" or "have" indicates that a feature, a number, a step, an operation, a component, a part or the combination thoseof described in the specification is present, but does not exclude a possibility of presence or addition of one or more other features, numbers, steps, operations, components, parts or combinations, in advance.

If it is not contrarily defined, all terms used herein including technological or scientific terms have the same meaning as those generally understood by a person with ordinary skill in the art. Terms defined in generally used dictionary shall be construed that they have meanings matching those in the context of a related art, and shall not be construed in ideal or excessively formal meanings unless they are clearly defined in the present application.

Hereinafter, exemplary embodiments according to the present invention will be described in detail with reference to accompanying drawings.

Figure 1:
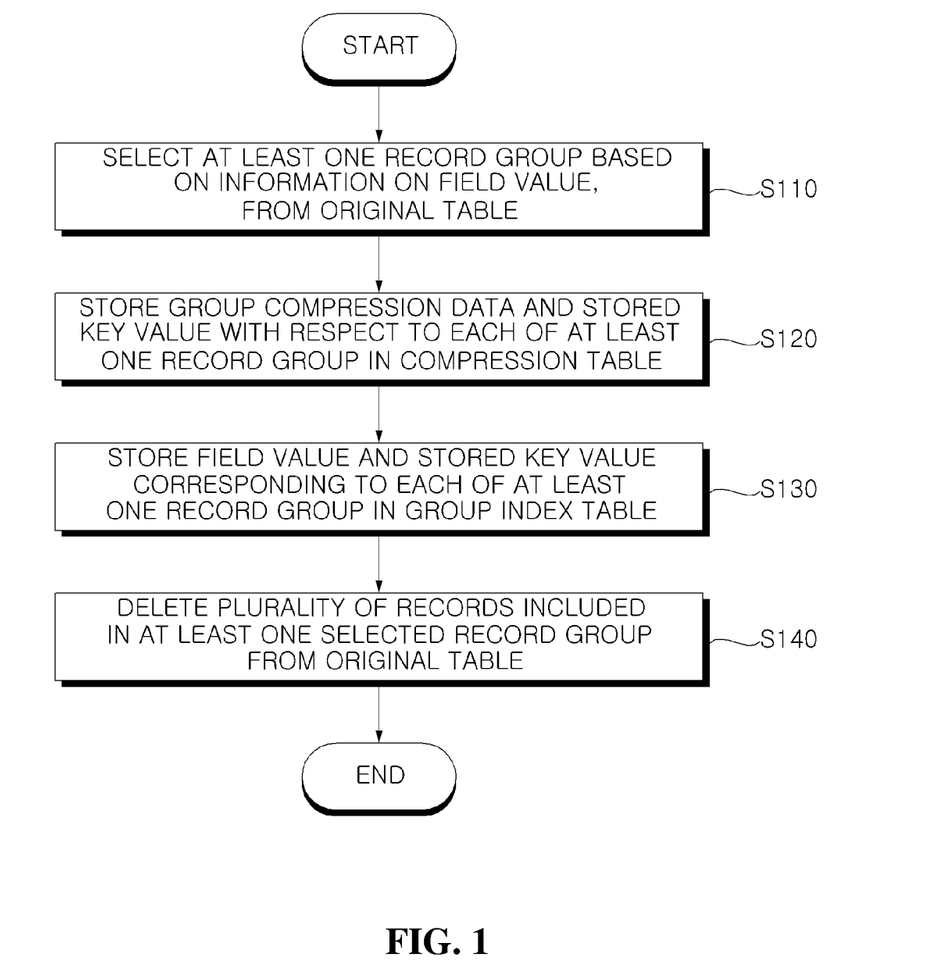
FIG. 1 is a flowchart illustrating a database archiving method for creating index information according to an exemplary embodiment of the present invention.

FIG. 1 is a flowchart illustrating a database archiving method for creating index information according to an exemplary embodiment of the present invention.

In step S110, a data archiving device selects at least one record group including a plurality of records from an original table in which data is archived, based on information on a field value.

The table is a unit forming a basic structure for storing data in the database and the original table may be a table to be archived to save a capacity among a plurality of tables included in the database.

For example, when the database archiving device selects at least one record group including a plurality of records based on information on a field value from the original table, the record group may be selected only by a plurality of records whose field values are within a predetermined range.

In the meantime, the field value which is used to select the record group may be determined as a field value of a field which is frequently retrieved in the original table. This is because when the archived database is retrieved later, a retrieving efficiency may be maximized using the created index information.

The record group is a group configured by a set of a plurality of records which is selected from the entire records included in the original table. One or more record groups may be created and a record group may be created to be limited to only some of the records as a target, rather than the entire original table, as needed. For example, a record group may be created to archive only the records before 2015, except records after 2015 in the original table.

In the meantime, the number of records included in one record group may be determined by comprehensively analyzing and examining the number of entire records included in the original table, a performance of a computer which retrieves a database, and a database retrieving condition having a high frequency.

According to another exemplary embodiment, when there is an exceed record group in which the number of records exceeds a threshold value, among at least one selected record group, the database archiving device may divide the record group having the number of records which exceeds a threshold value into a plurality of record groups having the number of records which is equal to or smaller than the threshold value.

For example, a threshold value which is the number of records which can be included in one record group may be set to 100000. If the selected record group includes an exceed record group having the number of records which exceeds the threshold value, this may lead overload of the computer or inefficiency, which may be problematic.

Therefore, when one record group has 100000 or more records, the records are divided into in the unit of 100000 records to create several record groups. For example, when one record group has 250000 records, the database archiving device may divide the exceed record group into a total of three record groups including two record groups having 100000 records and one record group having 50000 records.

In the meantime, since the plurality of record groups divided as described above is classified by the classification criteria based on the same field value, there may be no method for distinguishing the plurality of record groups. Therefore, serial numbers (for example, 1, 2, 3, 4, . . . ) are assigned to each of the plurality of divided record groups to be stored in a serial number field of a compression table. In this case, when the archived database is retrieved, the retrieval may be performed by distinguishing each record group.

In step S120, the data archiving device stores group compression data compressed and created for every record group and a stored key value which is uniquely assigned for every group compression data, in the compression table, with respect to each of at least one selected record group.

The compression table refers to a table in which the original table is compressed in the unit of record group so that the archived data is stored. Further, the compression table may include a field for storing group compression data which is compressed and created for every record group and at least one field for storing the stored key value uniquely assigned so as to correspond to the group compression data.

The stored key value is a key value which is uniquely assigned to every group compression data and a unique stored key value for every group compression data may be stored in a field corresponding to the stored key. Further, one or more fields may correspond to the stored key and when the stored key values which are distributed and stored are coupled to one or more fields, the field may have a unique stored key value for every group compression data.

The group compression data may be binary data which is created by compressing each of the classified record groups and a specific process of creating group compression data and storing the group compression data in a compression table will be described below.

In step S122, the database archiving device stores data of a plurality of records included in the record group in a buffer.

A size of the buffer in which the data of the plurality of records is stored may be determined based on a table structure (a number of fields, a type, and a size thereof) of the original table and a threshold value of records included in the record group.

For example, when it is assumed that the original table includes a total of three fields including DATE (eight characters), NAME (30 characters), and AGE (four bytes of integers) and a threshold value of the number of records of the record group is 100000, if one character is calculated as two bytes, the size of the buffer may be at least 8 million bytes (approximately 8 megabytes) from the calculation of 100000×(8×2+30×2+4).

The database archiving device sequentially reads the records included in the record group and the field values of the records to sequentially store the records and the field values in the buffer.

In step S124, the database archiving device compresses the data stored in the buffer to create group compression data.

The group compression data may be a result of a binary form created by compressing data of the record group stored in the buffer. In this case, in order to avoid a loss due to the compression, a lossless compression algorithm such as ZIP, CTW, LZ77, or LZW may be used.

In step S126, the database archiving device creates stored key values which are uniquely assigned to every created group compression data.

For example, when the database archiving device classifies the record groups based on a time and a predetermined field value and creates group compression data corresponding to the record group, a unique stored key value may be assigned to every created group compression data.

Finally, in step S128, the database archiving device stores the created group compression data in the same record on the compression table together with the assigned stored key value.

The compression table may include a field for storing a binary type group compression data and at least one field for storing the stored key value. That is, the created group compression data is stored in a field for storing compressed binary data and the stored key value corresponding to the group compression data is distributed and stored in at least one field.

Figure 7:
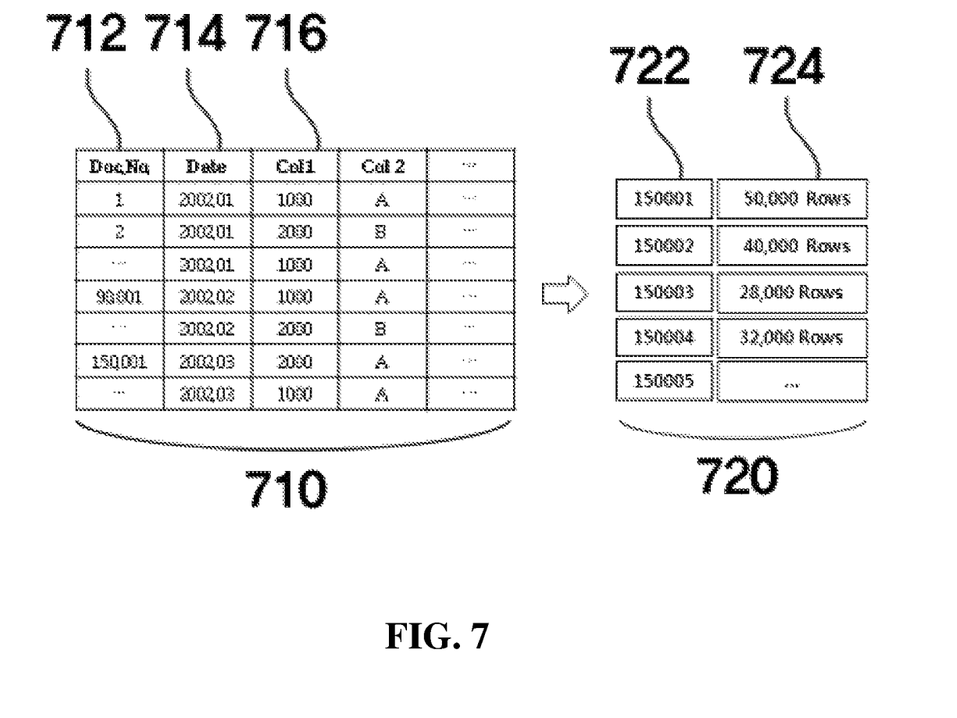
FIG. 7 is a view illustrating a structure of a compression table according to an exemplary embodiment of the present invention.

In the meantime, FIG. 7 is a view illustrating a structure of a compression table and a structure of the compression table will be described as follows.

The original table includes a Date field 714 for a time and a Col1 field 716 for a specific attribute. In this case, after classifying the original table 710 based on a field value of the Date field 714 which is information on a time and a value of the Col1 field 716 for a specific attribute, the database archiving device may store group compression data 724 and the stored key value 722 which is uniquely assigned and corresponds to the group compression data in the compression table 720, for every classification result.

For example, in the original table 710, record groups having a field value of Date field 714 of 2002.01 and a field value of the Col1 field 716 of 1000 are classified to be assigned with a stored key value 722 of 150001 and record groups having a field value of Date field 714 of 2002.01 and a field value of the Col1 field 716 of 2000 are classified to be assigned with a stored key value 722 of 150002. In this case, it is understood that the number of records having a field value of Date field 714 of 2002.01 and field values of the Col1 field 716 of 1000 and 2000 respectively is 50000 and 40000, from the information on the number of records of the group compression data 724 of the compression table 720.

In step S130, the database archiving device stores field values and stored key values corresponding to at least one record group in the group index table.

The group index table may include a field for storing information on a predetermined field value and at least one field for storing a stored key which is uniquely assigned to group compression data corresponding to information on the predetermined field value.

The group index table including the field value and the stored key value may be used to obtain the corresponding stored key value from the information on a predetermined field value and the compression table may be used to obtain group compression data corresponding to the stored key value.

Finally, in step S140, the database archiving device deletes the plurality of records included in at least one selected record group from the original table.

An object of compressing and archiving the database is to save a database storage space so that the plurality of records included in the archived record group is deleted from the original table to save the database storage space.

According to another exemplary embodiment, when the database archiving device selects at least one record group from the original table further based on information on a time, the database archiving device may store information on the corresponding time and the stored key value for each of at least one record group, in the period index table.

The period index table may include a field for storing information on a predetermined time and at least one field for storing a stored key which is uniquely assigned to group compression data corresponding to information on the predetermined time.

The period index table including the information on the predetermined time and the stored key value may be used to obtain the corresponding stored key value from the information on the predetermined time and the compression table may be used to obtain group compression data corresponding to the stored key value. In the meantime, the period index table may be selectively created and used based on a retrieving frequency for a time or a period.

For example, when the data archiving device selects the record group from the original table, based on a predetermined field value and information on a time and stores the group compression data created for every selected record group and a stored key value which is uniquely assigned to the created group compression data in the compression table.

Further, the data archiving device may store information on a field value (for example, a Col1 field value is 1000) which is common to the plurality of records included in every selected record group and the stored key value corresponding to the group compression data in the group index table. Further, the data archiving device may store information on a time (for example, a Date field value is 2002.01) which is common to the plurality of records included in every selected record group and the stored key value corresponding to the group compression data in the period index table.

Figure 8:
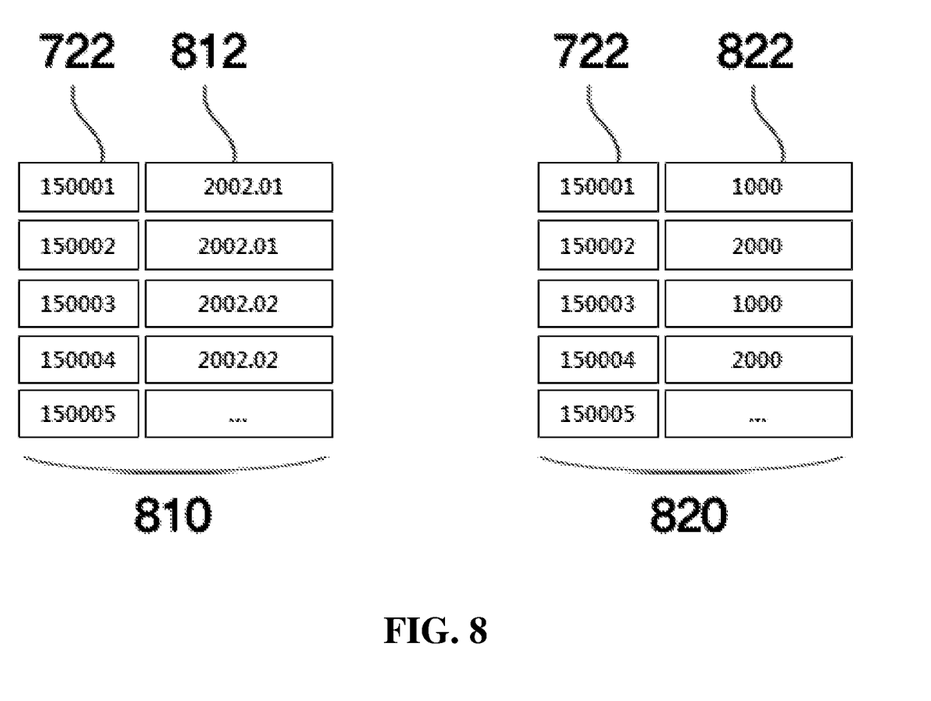
FIG. 8 is a view illustrating structures of a group index table and a period index table according to an exemplary embodiment of the present invention.

In the meantime, FIG. 8 is a view illustrating structures of a group index table and a period index table and the structures of the group index table and the period index table will be described as follows.

Referring to FIG. 7, group compression data 724 and stored key values 722 which are uniquely assigned to the corresponding group compression data are stored in the compression table 720. The data archiving device may store the stored key values 722 and information 822 on the field value in the group index table 820 illustrated in FIG. 8, based on the corresponding stored key value 722 and the Col1 field 716 value of the original table 710, with respect to the group compression data 724 stored in the compression table 720. Further, the data archiving device may store stored key values 722 and information 812 on the time in the period index table 810 illustrated in FIG. 8, based on the corresponding stored key value 722 and the Date field 714 value of the original table 710, with respect to the group compression data 724 stored in the compression table 720.

As described above, according to the database archiving method of the exemplary embodiment of the present invention, the database is archived through a compressing procedure so that the capacity of the database may be dramatically saved. Further, the group index table and the period index table are created from the original table and the connected table included in the database so that a retrieving efficiency for retrieving the archived data later may be maximized.

Figure 2:
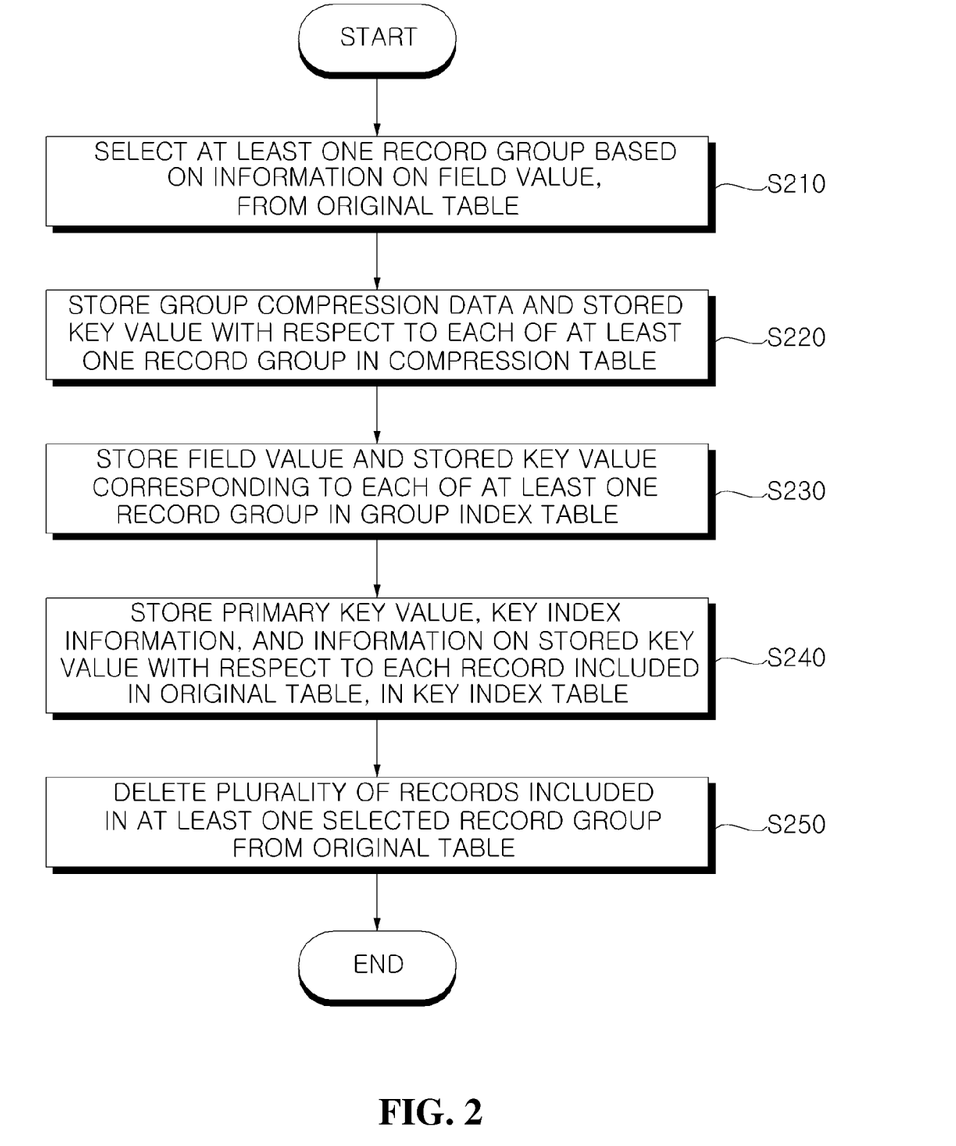
FIG. 2 is a flowchart illustrating a database archiving method for creating index information according to another exemplary embodiment of the present invention.

FIG. 2 is a flowchart illustrating a database archiving method for creating index information according to another exemplary embodiment of the present invention.

In step S210, the database archiving device selects at least one record group including a plurality of records from an original table in which data is archived, based on information on a field value.

In step S220, the database archiving device stores group compression data compressed and created for every record group and a stored key value which is uniquely assigned for every group compression data in the compression table, with respect to each of at least one selected record group.

In step S230, the database archiving device stores field values and stored key values corresponding to at least one record group in the group index table.

In step S240, the database archiving device stores information on a value of a primary key, key index information which is a position in the group compression data, and a stored key value corresponding to the group compression data in the key index table, with respect to individual records included in the original table.

The primary key refers to a field having a value which is uniquely identified for every record in the database and is also referred to as a basic key, a major key, or a unique key. Further, one or more primary keys may be present in one table.

Further, the key index information is information on a position in the group compression data where a record having a specific primary value is stored. For example, among information on 100000 records included in the group compression data, information on a storage order indicating that the record is a 1000-th stored record may be stored as key index information.

In the meantime, the reason that the value of the primary key is stored in the key index table is to directly retrieve a table to be retrieved not only by another field value and information on the time, but also by the primary key value. That is, when the user tries to retrieve a record having the primary key value from the table while inputting a specific primary key value, the key index table may be used.

More specifically, the database retrieving device may retrieve a record having the specific primary value from the key index table. Further, the database retrieving device may obtain group compression data corresponding to the stored key value from the compression table based on the key index information included in the retrieved record and the stored key value and retrieve a record that the user wants to retrieve, from the group compression data, using the key index information. This will be described below in more detail with reference to FIG. 3.

According to another exemplary embodiment, a database archiving device retrieves a record having the same primary key value as a record included in the original table from a plurality of records included in second group compression data which is created by compressing a plurality of records in at least one connected table and further stores sub index information indicating a position of the retrieved record in the second group compression data in a record having the same primary key value on the key index table.

The connected table is a table which is connected with the original table by means of the primary key. That is, the primary key may be present in both the original table and the connected table.

When there is at least one connected table which is connected with the original table by means of the primary key, the second group compression data is data created by compressing a plurality of records in at least one connected table. In this case, the second group compression data may be created by the same method as the group compression data described above with reference to FIG. 1 and may be stored in the compression table together with the unique stored key value similarly to the group compression data.

The sub index information is information indicating a position in the second group compression data where a record having a specific primary value is stored. For example, among information on 100000 records included in the second group compression data, information on a storage order indicating that the record is 1000-th stored record may be stored as sub index information.

For example, in the database, there may be one connected table which is connected with the original table by means of the primary key. When a user requires field value information of a field which is not present in the original table but is present in the connected table, the database archiving device may further store sub index information in a record having the same primary key value on the key index table so as to also retrieve the connected table.

According to still another exemplary embodiment, the database archiving device collects and compresses the sub index information on at least one connected table, and then stores the compressed sub index information in the key index table as new sub index information.

For example, the database archiving device may collect all sub index information on a position in at least one second group compression data of a record having the same primary key value in at least one connected table. Further, the database archiving device compresses the collected values to store the values in a record having the same primary key value on the key index table, as new sub index information.

Figure 9:
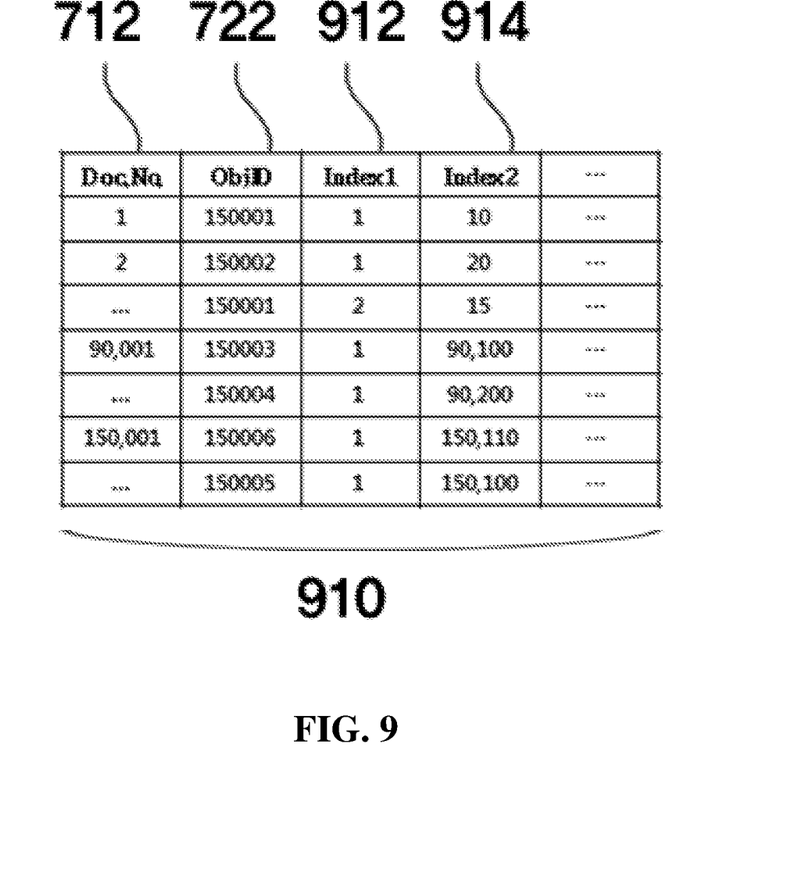
FIG. 9 is a view illustrating a structure of a key index table according to an exemplary embodiment of the present invention.

In the meantime, FIG. 9 is a view illustrating a structure of a key index table and a structure of the key index table will be described as follows.

Referring to FIG. 7, with respect to each record included in the original table 710, a value of Doc. No field 712 which is a primary key, a stored key value 722 corresponding to group compression data 724 in which the record is stored, and key index information 912 of the record may be stored in the key index table 910. Further, with respect to the second group compression data created based on a connected table (not illustrated) which is connected with the original table 710 by means of a primary key 712, sub index information 914 of a record of the connected table having the same primary key value 712 as the record of the original table 710 may be further stored in the key index table 910.

In step S250, the database archiving device deletes the plurality of records included in at least one selected record group from the original table.

As described above, according to the database archiving method of the exemplary embodiment of the present invention, the database is archived through a compressing procedure so that the capacity of the database may be dramatically saved. Further, the key index table is created from the original table and the connected table included in the database so that a retrieving efficiency of retrieving the archived data using the primary key value later may be maximized.

Figure 3:
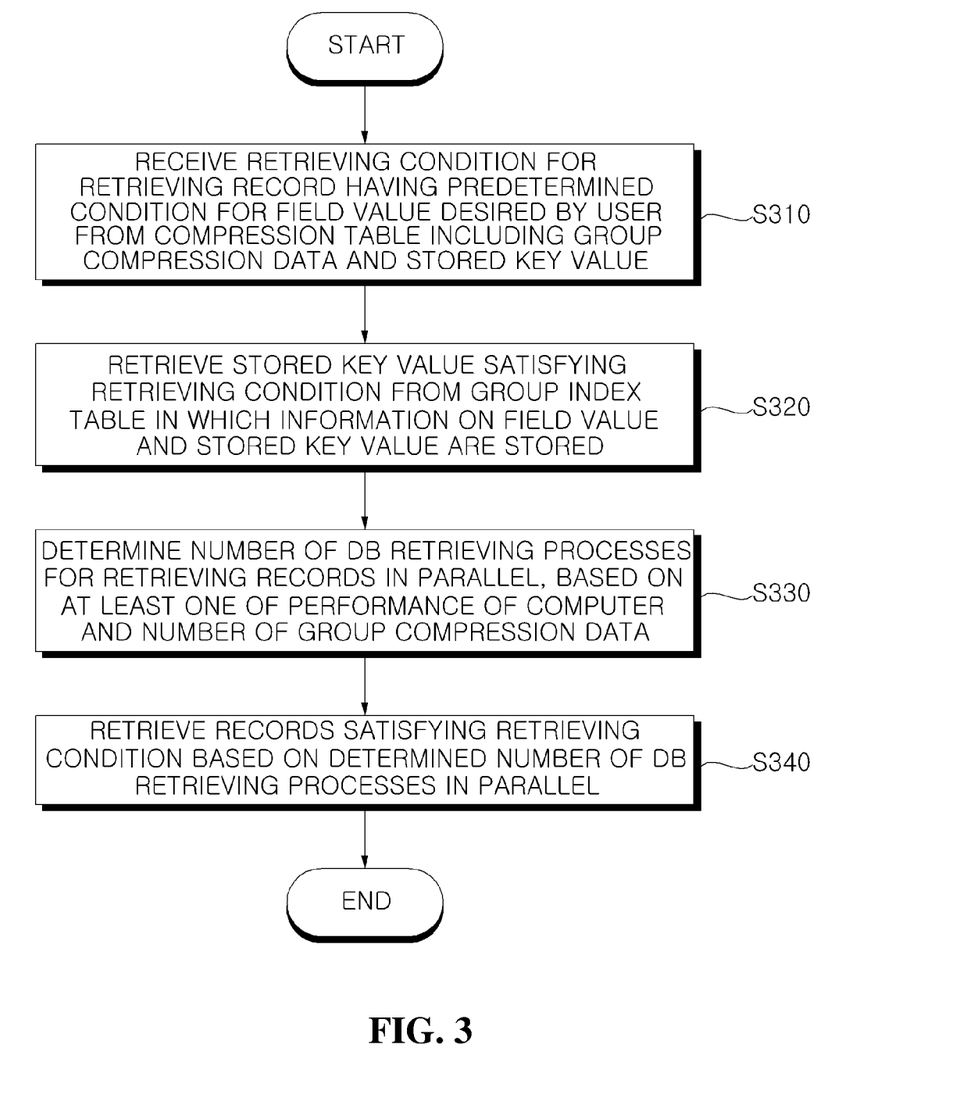
FIG. 3 is a flowchart illustrating an archived database retrieving method using index information according to an exemplary embodiment of the present invention.

FIG. 3 is a flowchart illustrating an archived database retrieving method using index information according to an exemplary embodiment of the present invention.

In step S310, the database retrieving device receives a retrieving condition for retrieving a record of a predetermined condition for a field value desired by the user from the compression table.

The compression table is a table including group compression data created by compressing a plurality of records corresponding to information on the field value by the database retrieving device and information on a unique stored key value corresponding to the group compression data.

The received retrieving condition may be a structured query language (SQL) text type retrieving condition. That is, the database retrieving device may receive a retrieving condition in the form of SQL text to retrieve a record including a condition for a field value desired by the user from the compression table in which the group compression data and the stored key value corresponding to the group compression data are stored.

In step S320, the database retrieving device retrieves a stored key value satisfying the retrieving condition from the group index table.

The group index table is a table including information on a field value and information on a stored key value corresponding to the information on the field value.

The database retrieving device retrieves a record satisfying the retrieving condition including a condition of a field value of the user from the group index table. Further, the database retrieving device may collect information on the stored key value included in the retrieved record.

According to another exemplary embodiment, when group compression data created further based on information on a time is included in the compression table and a predetermined condition for a time is further included in the received retrieving condition, the database retrieving device may retrieve a stored key value satisfying the retrieving condition from the period index table.

The period index table is a table including information on a time and information on a stored key value corresponding to the information on a time.

When the group compression data included in the compression table is created further based on not only information on a field value, but also information on a time, the database retrieving device may retrieve a record of the compression table further using the retrieving condition for a time.

More specifically, the database retrieving device may retrieve a record satisfying the retrieving condition for a time from the period index table. Further, the database retrieving device may collect information on the stored key value included in the retrieved record.

In the meantime, when the received retrieving condition includes both information on a field value and the information on a time, the database retrieving device may collect information on a stored key value from both the group index table and the period index table. Further, information on a stored key value which is commonly collected from the group index table and the period index table among the collected information on a stored key value may be finally a stored key value required to retrieve the record.

In step S330, the database retrieving device determines the number of DB retrieving processes for retrieving the records in parallel, based on at least one of a performance of a computer which performs the retrieval and the number of group compression data corresponding to the stored key value satisfying the retrieving condition.

The DB retrieving process refers to a single process of retrieving a record from an archived database. Therefore, when the retrieval of the records is performed in parallel, it may be understood that a plurality of DB retrieving processes is simultaneously performed.

In the meantime, the reason that the number of DB retrieving processes is determined based on the performance of the computer is because during the DB retrieving process, a process of retrieving records from the compressed group compression data may apply a heavy load to the computer. Further, the reason that the number of DB retrieving processes is determined based on the number of group compression data corresponding to the stored key value satisfying the retrieving condition is because the number of group compression data may be eventually related to an amount of retrieval or a retrieving range.

In the meantime, a specific process of determining the number of DB retrieving processes for retrieving the records in parallel will be described below in more detail with reference to FIG. 4.

In step S340, the database retrieving device retrieves records which satisfy the retrieving condition in parallel, based on the determined number of DB retrieving processes.

For example, the database retrieving device prepares DB retrieving processes as many as the determined number and retrieves the records in parallel by dividing the retrieving range for every DB retrieving process.

According to another exemplary embodiment, when a retrieving condition for a primary key value is further included in the retrieving condition, the database retrieving device may further retrieve a stored key value and key index information of a record satisfying a retrieving condition for a primary key value from the key index table. Further, the database retrieving device may retrieve the records in parallel, further based on the retrieved stored key value and key index information.

The key index table is a table including a value of a primary key for every record of the archived original table, key index information which is a position in the group compression data, and information on a stored key value corresponding to the group compression data.

For example, not only information on the field value and the time, but also information on the value of the primary key may be included in the retrieving condition received from the user. In this case, the database retrieving device retrieves a record having the value of the primary key from the key index table and retrieves a record satisfying the retrieving condition of the user further using the stored key value of the retrieved record and the key index information.

According to still another exemplary embodiment, when the database retrieving device retrieves a stored key value and key index information for second group compression data created by compressing a plurality of records from at least one connected table, the database retrieving device may further retrieve sub index information of a record satisfying the retrieving condition of the user from the key index table. When the database retrieving device retrieves records in parallel, the database retrieving device may perform retrieval further based on the retrieved sub index information and second group compression data corresponding to the sub index information.

The connected table is a table which is connected to the original table by means of a primary key and the primary key may be present in both the original table and the connected table. In the meantime, the key index table may further include sub index information which is a position in the second group compression data for every record of the connected table.

When there is at least one connected table which is connected with the original table by means of the primary key, the second group compression data is data created by compressing a plurality of records in at least one connected table. In this case, the second group compression data may be created by the same method as the group compression data described above with reference to FIG. 1 and may be stored in the compression table together with the unique stored key value similarly to the group compression data.

For example, when a condition for a field value which is present only in the connected table is further included in the retrieving condition received from the user, the database retrieving device further retrieves sub index information corresponding to the primary key value satisfying the retrieving condition from the key index table and retrieves information on a field value included in the second group compression data using the sub index information.

According to another exemplary embodiment, the database retrieving device allocates at least one group compression data to each of DB retrieving processes and retrieves records in parallel based thereon.

For example, when the number of group compression data corresponding to the stored key value satisfying the retrieving condition is six and the determined number of DB retrieving processes is four, the database retrieving device may allocate two group compression data to every two of four DB retrieving processes, respectively, and allocate one group compression data to each of the remaining DB retrieving processes. Through four DB retrieving processes, records for one or two allocated group compression data may be retrieved in parallel.

In this case, each DB retrieving process decompresses the allocated group compression data to be stored in the buffer and performs the retrieval through a process of retrieving records satisfying the retrieving condition from the data stored in the buffer.

According to another exemplary embodiment, the database retrieving device retrieves records satisfying a retrieving condition further based on table structure information which is information regarding a type, a size, an order, and a name of each field included in the original table which is archived to a compression table.

When the group compression data is decompressed to be stored in the buffer and records satisfying the retrieving condition are retrieved from the data stored in the buffer, if the database retrieving device knows the table structure information which is information regarding a type, a size, an order, and a name of each field included in the original table, the retrieval may be more easily performed based on the table structure information.

According to still another exemplary embodiment, the DB retrieving process may be performed using a process or a thread allocated for every DB retrieving process.

Since each DB retrieving process needs to retrieve records in parallel, in order to satisfy the parallel characteristic, one child process or a thread may be allocated to every DB retrieving process to perform retrieval. In this case, whether to allocate a child process or a thread for every DB retrieving process may be determined based on whether there is a support depending on a CPU type or an OS type of a computer which performs retrieval.

For example, when the number of DB retrieving processes is determined to be six, six child processes may be allocated to every DB retrieving process and six child processes may retrieve records for group compression data allocated to the DB retrieving process, in parallel.

As described above, according to the retrieving method of archived database according to the exemplary embodiment of the present invention, the records may be retrieved in parallel based on the number of DB retrieving processes determined in accordance with the performance of the computer and a database retrieving range.

Figure 4:
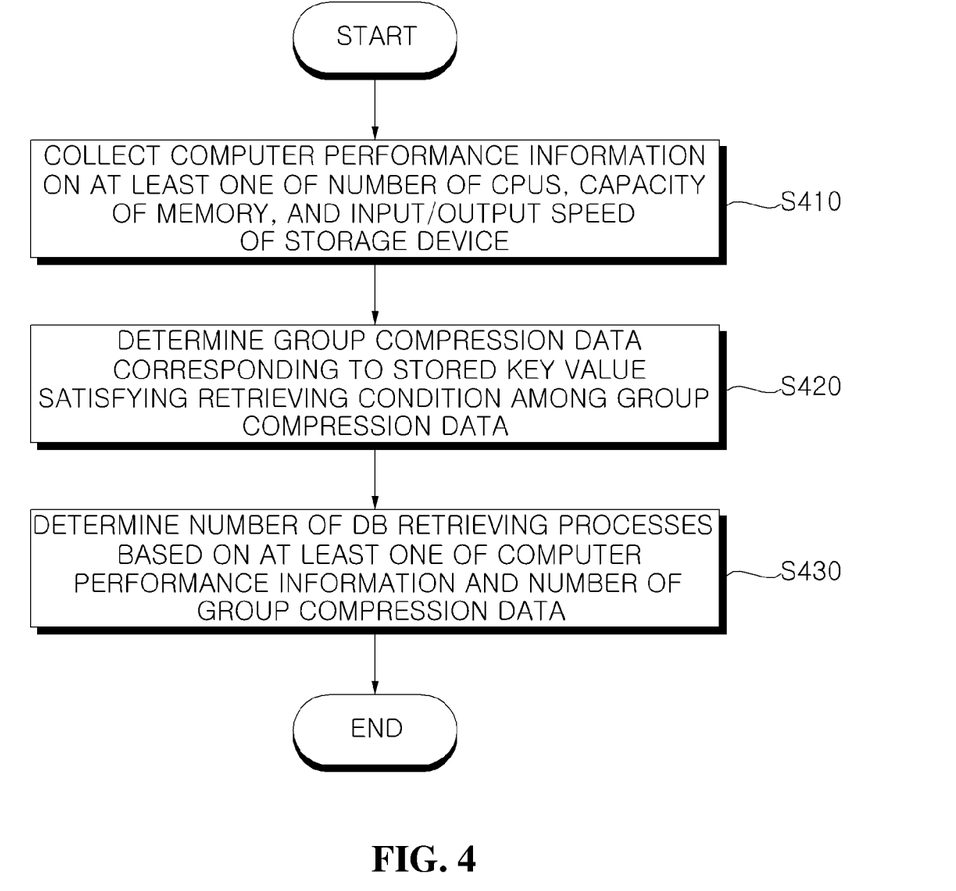
FIG. 4 is a flowchart illustrating a method of determining the number of DB retrieving processes according to an exemplary embodiment of the present invention.

FIG. 4 is a flowchart illustrating a method of determining the number of DB retrieving processes according to an exemplary embodiment of the present invention.

In step S410, the database retrieving device collects computer performance information on at least one of a number of CPUs included in the computer, a capacity of a memory, and an input/output speed of a storage device.

The performance of the computer may be determined by performances of a CPU, a memory, and a storage device included in the computer which retrieves the records. Specifically, the performance of the CPU may be determined by the number of CPUs installed in the computer, a clock frequency, a cash size, and the number of cores for every CPU. Further, the performance of the memory may be determined by a capacity and an operating frequency. Further, the performance of the storage device may be determined by the input/output speed.

Therefore, the database retrieving device may collect computer performance information including information on at least one of a CPU, a memory, and a storage device of a computer which retrieves the records.

In step S420, the database retrieving device determines the number of group compression data corresponding to the stored key value satisfying the received retrieving condition among the group compression data stored in the compression table.

For example, when the user creates a retrieving condition of January 2015 to October 2015, with respect to the stored key value stored in the compression table and the group compression data corresponding to the stored key value, if the stored key values satisfying the retrieving condition are found from the period index table, the number of group compression data corresponding to the stored key values may be determined.

Finally, in step S430, the database retrieving device determines the number of DB retrieving processes for retrieving records in parallel, based on at least one of the collected computer performance information and the determined number of group compression data.

For example, the database retrieving device may comprehensively analyze the collected computer performance information and the number of group compression data to determine the number of DB retrieving processes for retrieving records in parallel.

More specifically, even though the collected computer performance information is not excellent, if the number of group compression data is not large, the number of DB retrieving processes may be determined to be small in accordance with the number of group compression data and in contrast, when the collected computer performance information is excellent but the determined number of group compression data is large, the number of DB retrieving processes may also be determined to be small in accordance with the computer performance information.

As described above, according to the method of determining the number of DB retrieving processes according to the exemplary embodiment of the present invention, the number of DB retrieving processes is determined by the number of group compression data corresponding to the information on the performance of a computer which performs the retrieval and the stored key value satisfying the retrieving condition so that the records may be more efficiently retrieved in parallel.

Figure 5:
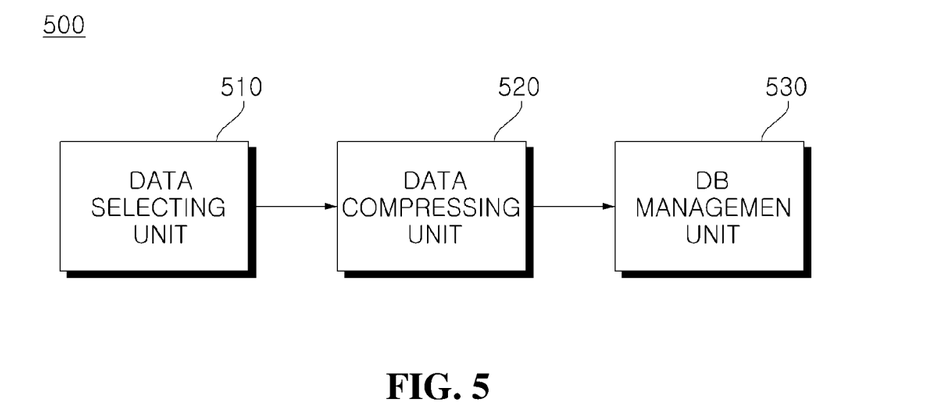
FIG. 5 is a view illustrating a database archiving device which creates index information according to an exemplary embodiment of the present invention.

FIG. 5 is a view illustrating a database archiving device which creates index information according to an exemplary embodiment of the present invention.

Referring to FIG. 5, a database archiving device 500 which creates index information includes a database selecting unit 510, a data compressing unit 520, and a DB management unit 530. In this case, the database archiving device 500 which creates index information may be installed in a computer in which a database is installed or may be installed in a computer which is connected to the database through a network.

The data selecting unit 510 selects at least one record group including a plurality of records from an original table in which data is archived, based on information on a field value.

The data compressing unit 520 compresses at least one selected record group for every record group to create group compression data.

The DB management unit 530 stores the group compression data and the stored key value uniquely assigned to every group compression data in a compression table, stores the field value and the stored key value corresponding to at least one record group and deletes the plurality of records included in at least one selected record group from the original table.

According to another exemplary embodiment, when the data selecting unit 510 selects at least one record group from the original table further based on information on a time, the DB management unit 530 may further store corresponding information on a time and the stored key value for each of at least one record group, in the period index table.

According to still another exemplary embodiment, the DB management unit 530 may further store a value of a primary key, key index information which is a position in the group compression data, and information on a stored key value corresponding to the group compression data, with respect to every record included in the original table, in the key index table.

According to still another exemplary embodiment, when there is at least one connected table which is connected to the original table by means of the primary key, the DB management unit 530 further retrieves a record having the same primary key value as a record included in the original table from a plurality of records included in second group compression data which is created by compressing a plurality of records in at least one connected table and further stores sub index information indicating a position of the retrieved record in the second group compression data in a record having the same primary key value on the key index table.

Figure 6:
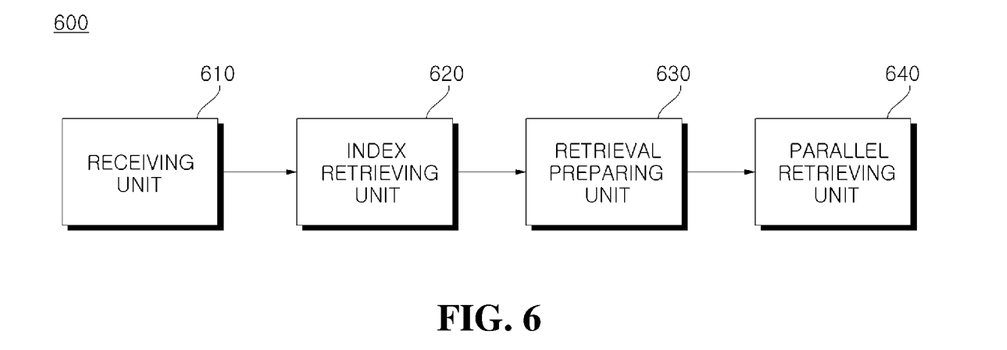
FIG. 6 is a view illustrating an archived database retrieving device using index information according to an exemplary embodiment of the present invention.

FIG. 6 is a view illustrating an archived database retrieving device using index information according to an exemplary embodiment of the present invention.

Referring to FIG. 6, the archived database retrieving device 600 includes a receiving unit 610, an index retrieving unit 620, a retrieval preparing unit 630, and a parallel retrieving unit 640. In this case, the archived database retrieving device 600 may be installed in a computer in which a database is installed or may be installed in a computer which is connected to the database through a network.

The receiving unit 610 receives a retrieving condition for retrieving a record having a predetermined condition for a field value desired by a user from a compression table including group compression data created by compressing a plurality of records corresponding to information on a field value and a unique stored key value corresponding to the group compression data.

The index retrieving unit 620 retrieves a stored key value satisfying a received retrieving condition from a group index table in which the information on a field value and a stored key value corresponding to the information on a field value are stored.

The retrieval preparing unit 630 determines the number of DB retrieving processes for retrieving the records in parallel, based on at least one of a performance of a computer which performs the retrieval and the number of group compression data corresponding to the stored key value satisfying the retrieving condition.

The parallel retrieving unit 640 retrieves the records satisfying the retrieving condition based on the determined number of DB retrieving processes, in parallel.

According to another exemplary embodiment, when group compression data which is created further based on the information on a time is included in the compression table and a predetermined condition for the time is further included in the received retrieving condition, the index retrieving unit 620 may further retrieve a stored key value satisfying the received retrieving condition from a period index table in which information on a time and a stored key value corresponding to the information on a time are stored.

According to still another exemplary embodiment, when a retrieving condition for a primary key value is included in the received retrieving condition, the index retrieving unit 620 may further retrieve a stored key value and key index information of a record satisfying the received retrieving condition, from a key index table in which a primary key value for every record of the original table which is archived to the compression table, key index information which is a position in the group compression data, and information on a stored key value corresponding to the group compression data are stored and the parallel retrieving unit 640 may perform the retrieval further based on the stored key value and the key index information.

According to still another exemplary embodiment, when there is at least one connected table which is connected with the original table by means of a primary key, with respect to the second group compression data which is created by compressing a plurality of records in at least one connected table, the index retrieving unit 620 further retrieves sub index information of a record satisfying the retrieving condition from the key index table which includes sub index information which is a position in the second group compression data for every record and the parallel retrieving unit 640 may perform retrieval further based on the sub index information and the second group compression data.

According to still another exemplary embodiment, the retrieval preparing unit 630 collects computer performance information on at least one of the number of CPUs included in the computer, a capacity of a memory, and an input/output speed of a storage device, determines the number of group compression data corresponding to a stored key value satisfying the received retrieving condition from the group compression data stored in the compression table, and determines the number of DB retrieving processes for retrieving records in parallel based on at least one of the collected computer performance information and the determined number of group compression data.

The above-described exemplary embodiments of the present invention may be created by a computer executable program and implemented in a general use digital computer which operates the program using a computer readable recording medium.

The computer readable recording medium includes a magnetic storage medium (for example, a ROM, a floppy disk, and a hard disk) and a storing medium such as an optical reading medium (for example, a CD-ROM and a DVD).

For now, the present invention has been described with reference to the exemplary embodiments. It is understood by those skilled in the art that the present invention may be implemented as a modified form without departing from an essential characteristic of the present invention. Therefore, the disclosed exemplary embodiments may be considered by way of illustration rather than limitation. The scope of the present invention is presented not in the above description but in the claims and it may be interpreted that all differences within an equivalent range thereto may be included in the present invention.

The invention claimed is:

1. A database archiving and retrieving method for a database, the database archiving method comprising:
  selecting at least one record group including a plurality of records from an original table of the database in which data is archived, based on information on a field value of each of the at least one record group;
  storing group compression data compressed to be created for the each of the at least one record group and a stored key value uniquely assigned to the group compression data, in a compression table of the database;
  storing the field value and the stored key value corresponding to the each of the at least one record group, in a group index table; and
  deleting the plurality of records included in the at least one selected record group from the original table;
  storing a primary key value, key index information which is a position in the group compression data, and information on a stored key value corresponding to the group compression data, with respect to each of records included in the original table, in a key index table;
  when there is at least one connected table which is connected with the original table by means of the primary key, with respect to second group compression data which is created by compressing a plurality of records in the at least one connected table, retrieving a record having the same primary key value as a record including in the original table, among a plurality of records included in the second group compression data; and
  further storing sub-index information which is a position in the second group compression data with respect to the retrieved record having the same primary key value on the key index table; and
  retrieving records satisfying a retrieving condition in parallel, based on a determined number of DB retrieving processes,
  wherein the retrieving of the records in parallel is performed further based on the stored key value, the key index information, the sub-index information, and the second group compression data.

2. The database archiving and retrieving method of claim 1, further comprising:
when the at least one record group is selected further based on information on a time, from the original table, storing the information on the time and the stored key value corresponding to the each of the at least one record group, in a period index table.

3. A database archiving and retrieving device for a database (DB), the device comprising:
at least one processor coupled to a memory, the at least processor being configured to:
select at least one record group including a plurality of records from an original table of the database in which data is archived, based on information on a field value of each of the at least one record group;
compress and create group compression data for the each of the at least one record group;
store the group compression data and a stored key value which is uniquely assigned to the group compression data in a compression table of the database;
store the field value and the stored key value corresponding to the each of the at least one record group in a group index table;
delete the plurality of records included in the at least one selected record group from the original table;
store a primary key value, key index information which is a position in the group compression data, and information on the stored key value corresponding to the group compression data, with respect to each of records included in the original table, in a key index table;
when there is at least one connected table which is connected with the original table by means of the primary key, with respect to second group compression data which is created by compressing a plurality of records in the at least one connected table, retrieve a record having the same primary key value as a record including in the original table, among a plurality of records included in the second group compression data; and
further store sub-index information which is a position in the second group compression data with respect to the retrieved record having the same primary key value on the key index table; and
retrieve records satisfying a retrieving condition in parallel, based on a determined number of DB retrieving processes,
wherein the retrieving of the records in parallel is performed further based on the stored key value, the key index information, the sub-index information, and the second group compression data.

4. The database archiving and retrieving device of claim 3, wherein, when the at least one processor selects the at least one record group from the original table further based on information on a time, the at least one processor further stores the information on the time and the stored key value corresponding to the each of the at least one record group, in a period index table.

* * * * *